(12) United States Patent
Petach

(10) Patent No.: US 10,302,071 B2
(45) Date of Patent: May 28, 2019

(54) TOROIDAL SPIRAL CASCADING OF MULTIPLE HEAT ENGINE STAGES IN TRAVELING WAVE THERMOACOUSTIC ENGINES

(71) Applicant: Northrop Grumman Systems Corporation, Falls Church, VA (US)

(72) Inventor: Michael B. Petach, Redondo Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 92 days.

(21) Appl. No.: 15/795,657

(22) Filed: Oct. 27, 2017

(65) Prior Publication Data
US 2019/0131849 A1 May 2, 2019

(51) Int. Cl.
*F03G 7/00* (2006.01)
*F02G 1/043* (2006.01)
*H02K 7/18* (2006.01)

(52) U.S. Cl.
CPC ........... *F03G 7/002* (2013.01); *F02G 1/0435* (2013.01); *H02K 7/1876* (2013.01); *F02G 2243/54* (2013.01); *F02G 2254/90* (2013.01); *F02G 2257/00* (2013.01); *F02G 2280/10* (2013.01); *F02G 2290/00* (2013.01)

(58) Field of Classification Search
CPC ... F03G 7/002; F03G 7/00; F03G 7/06; F02G 2243/54; F02G 1/0435; F02G 1/043; F02G 1/044; F02G 1/053; F02G 1/055; F02G 1/057; F02G 2254/90; F02G 2290/00; F02G 2257/00; F02G 2280/10; F25B 9/145; F25B 2309/1405; F25B 2309/1425; F25B 2309/1406; F25B 2309/1407; F25B 2309/1408; F25B 2309/1409; F25B 2309/1414; F25B 2309/1415; F25B 2309/1416; F25B 2309/1421; F25B 2309/1423; H02K 7/1876

See application file for complete search history.

(56) References Cited

U.S. PATENT DOCUMENTS

2008/0110180 A1  5/2008  Watanabe et al.

FOREIGN PATENT DOCUMENTS

| CN | 101 275 541 A | 10/2008 | |
|---|---|---|---|
| CN | 104 775 932 B | 3/2016 | |
| WO | WO-2008131687 A1 * | 11/2008 | ............. F03G 7/002 |

OTHER PUBLICATIONS

Notification of Transmittal of the International Search Report and the Written Opinion of the International Searching Authority, or the Declaration, dated Feb. 1, 2019 in related Application No. PCT/US2018/053734.

* cited by examiner

*Primary Examiner* — Mark A Laurenzi
*Assistant Examiner* — Xiaoting Hu
(74) *Attorney, Agent, or Firm* — McCracken & Gillen LLC

(57) ABSTRACT

A multi-stage traveling wave thermoacoustic engine is disclosed. A plurality of heat engine stages are formed as a toroidal spiral cascade of N stages inside a pressure vessel. Each stage feeds into the next stage such that all of the thermoacoustic power cycles past a common set of thermal interfaces multiple times with the single domed pressure vessel. The inventive thermoacoustic engine is simpler and cheaper to manufacture and more reliable due to the minimization of hot joints.

15 Claims, 8 Drawing Sheets

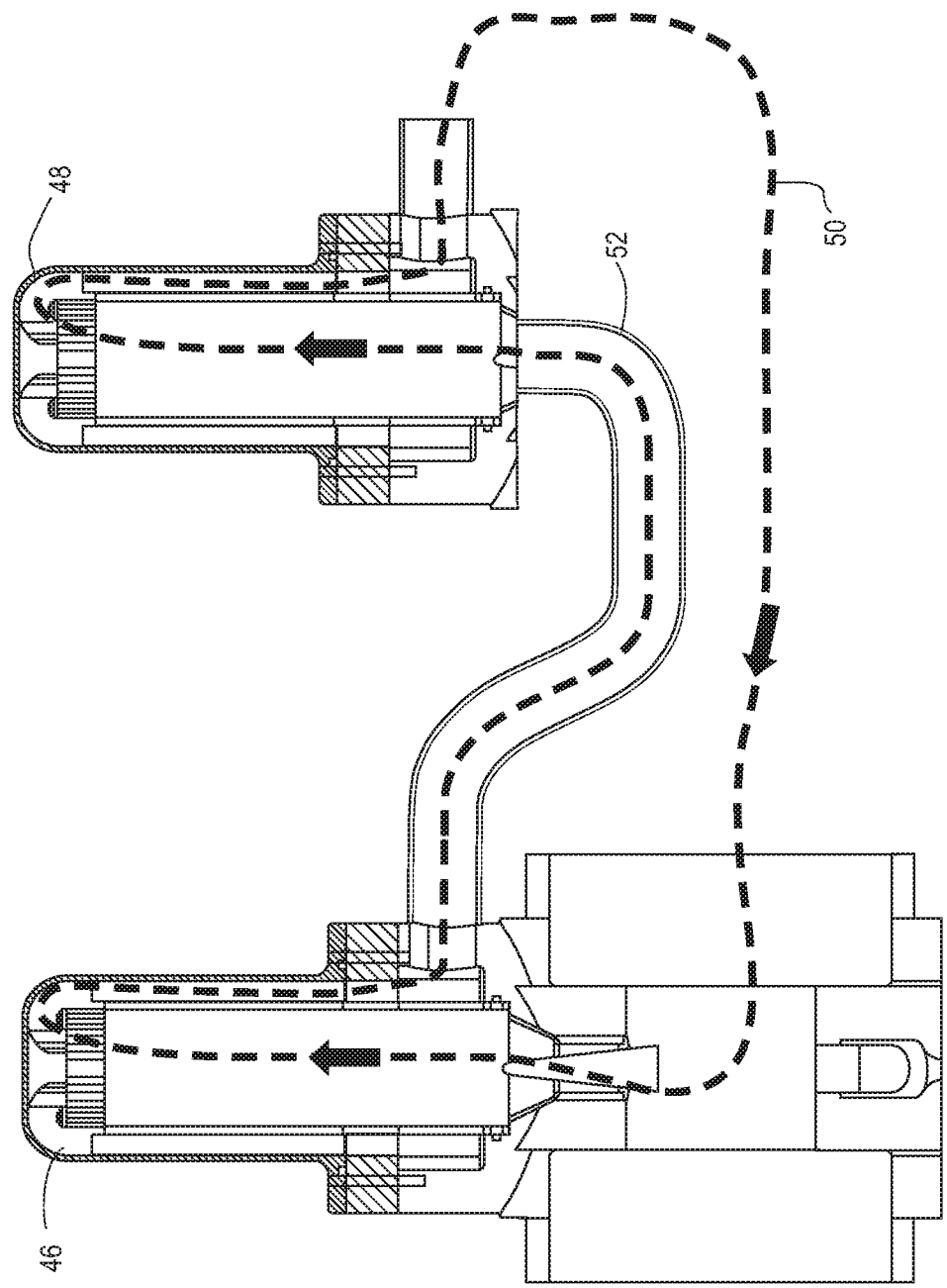

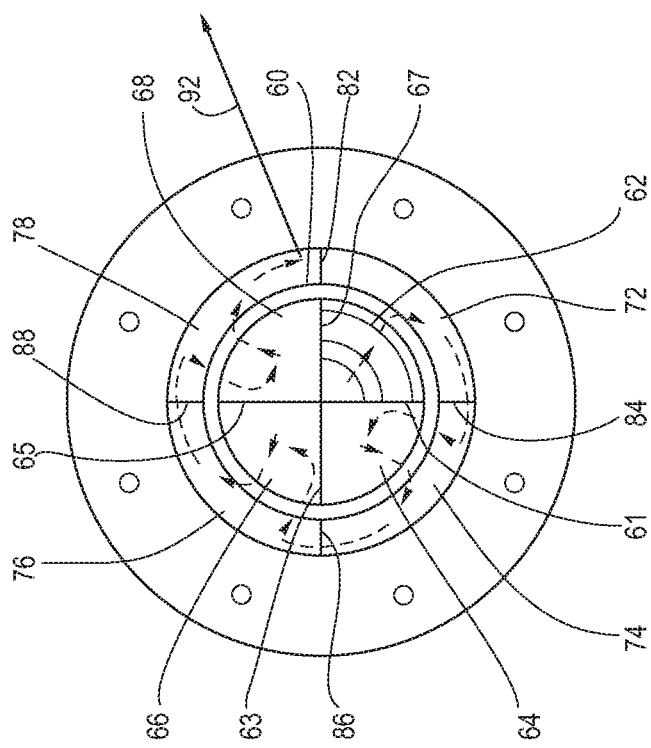
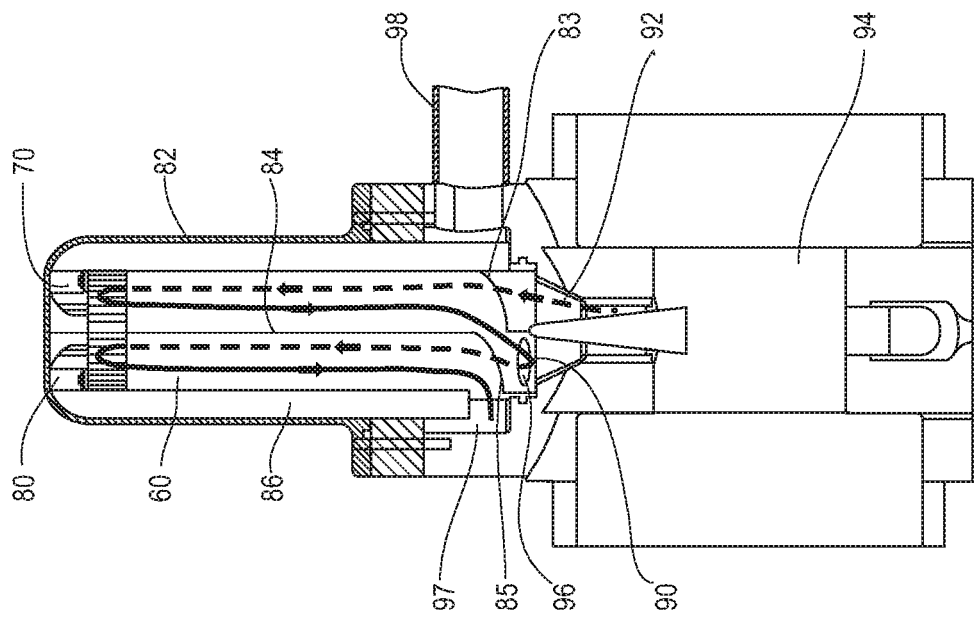

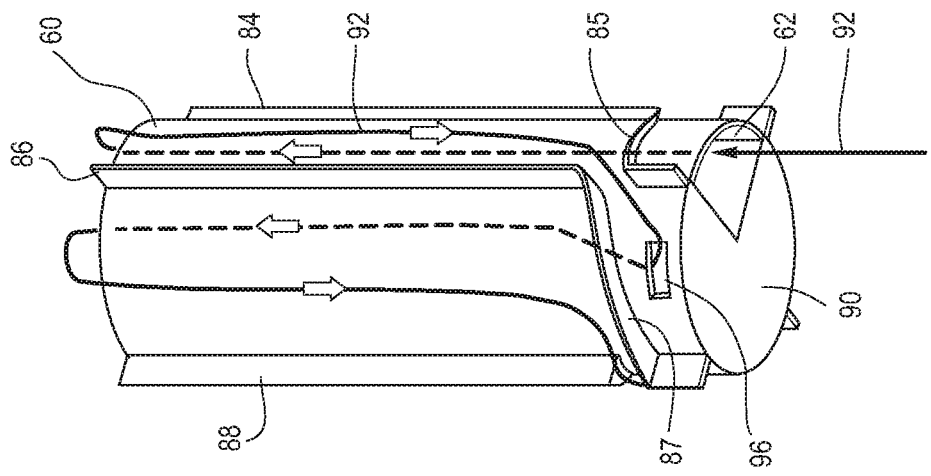
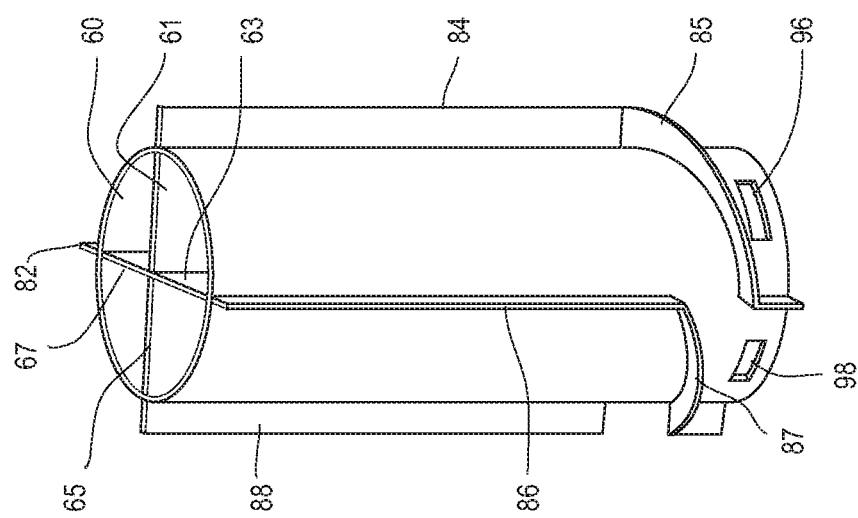

TOROIDAL SPIRAL CASCADING OF MULTIPLE HEAT ENGINE STAGES IN TRAVELING WAVE THERMOACOUSTIC ENGINES

BACKGROUND

The invention relates generally to heat engines and more particularly to traveling wave thermoacoustic heat engines.

One application for thermoacoustic heat engines is powering satellites, particularly in deep space. While Earth-orbiting satellites typically use solar cells as an energy source, this is not available as satellites move farther from the Sun. Consequently, these satellites are powered by a radio-isotope heat source such as plutonium whose heat is converted into electricity via the thermoelectric effect. However, this system for generating electricity is not very efficient.

Thermoacoustic heat engines are a more efficient way to generate power from a heat source. In essence, a thermoacoustic heat engine consists of a tube filled with a gas. Applying heat at one end of the tube creates a heat differential along the length of the tube and induces sound waves which can be used to convert the heat into mechanical energy. Thermoacoustic heat engines can generally be classified as either resonant or traveling wave types.

A schematic of a representative traveling wave thermoacoustic heat engine is shown in FIG. 1. A sealed system filled with, for example, pressurized helium gas, includes a torus 100, a resonator 102 and a variable acoustic load 104. Torus 100 includes cold heat exchanger 106, regenerator 108 and hot heat exchanger 110. A sound wave is induced in the helium gas by creating a temperature difference across regenerator 108 by using cold heat exchanger 106 and hot heat exchanger 110. Thermal buffer tube 112 provides a thermal buffer between hot heat exchanger 110 and the cold side (114 and 116) by providing space for the heated helium gas to oscillate without reaching the cold side. A flow straightener and heat exchanger 114 suppress prevent certain types of gas flow and reduces heat loss thereby improving the thermal efficiency of the heat engine.

Torus 100 also includes a feedback inertance 116 which provides a path for the helium gas to flow through to compliance 118, jet pump 120 and finally back to cold heat exchanger 106. The configuration and volume of inertance 116 and compliance 118 are selected to control the phase of the traveling wave induced in the helium gas. Jet pump 120 is used to reduce gas streaming and thereby improve thermal efficiency.

FIG. 1 depicts a single stage thermoacoustic heat engine. The amount of acoustic power output per acoustic power input (the gain) per stage of a thermoacoustic heat engine is limited by the temperature ratio between the hot and cold ends of the regenerator. To increase the overall gain of the engine, single stage thermoacoustic heat engines are sometimes connected in series to form a multi-stage heat engine. However, prior art multi-stage engines are thermally and mechanically cumbersome, volumetrically inefficient, do not scale down well and are subject to high thermal stresses. This is due to the geometries used to expose the gaseous working fluid's acoustic power path multiple times to a common set of thermal interfaces. A folded loop topology has been used to provide a common set of thermal interface points, but it is very large and only works for a subclass of traveling wave heat engines.

Thus, a need exists for a multi-stage thermoacoustic engine with improved volumetric and thermal efficiency, better scalability and greater resistance to high thermal stresses.

SUMMARY

The invention in one implementation encompasses a multistage traveling wave thermoacoustic engine with a topological folding of the acoustic power path to re-access the same thermal interface multiple times within a single domed pressure vessel. The inventive thermoacoustic engine is simpler and cheaper to manufacture and more reliable due to the minimization of hot joints.

In an embodiment, the invention encompasses a multi-stage traveling wave thermoacoustic engine having a domed cylindrical shell; a thermal buffer tube coaxially located inside said shell, said thermal buffer tube further comprising one or more tube partitions dividing the thermal buffer tube into a plurality of sealed tube stages; an annular regenerator located between the shell and the thermal buffer tube, said regenerator further comprising one or more regenerator partitions dividing the regenerator into a plurality of sealed regenerator stages corresponding to the stages in the thermal buffer tube; a hot heat exchanger at a first end of said shell; and a cold heat exchanger at a second end of said shell opposite the first end; wherein said thermal buffer tube stages and said regenerator stages are operatively coupled such that a gas flow enters a lower end of a first thermal buffer tube stage, flows past the hot heat exchanger into a first regenerator stage and is directed by the one or more regenerator partitions into a second thermal buffer tube stage adjacent to the first thermal buffer tube.

In a further embodiment, the second thermal buffer tube stage includes an opening for receiving the gas flow from the first regenerator stage.

In another embodiment, the thermal buffer tube stages are operatively coupled such that the gas flows past the hot heat exchanger into a second regenerator stage and is directed by the one or more regenerator partitions into a third thermal buffer tube stage adjacent to the second thermal buffer tube stage.

In a further embodiment, the third thermal buffer tube stage includes an opening for receiving the gas flow from the second regenerator stage.

The yet another embodiment, the multi-stage traveling wave thermoacoustic engine includes a compliance; an inertance coupled to said compliance; and a linear alternator operatively coupled to the first thermal buffer tube stage; wherein the gas flow exits a regenerator stage and enters the compliance.

In another embodiment, the linear alternator includes a jet pump.

In another embodiment, the multi-stage traveling wave thermoacoustic engine includes two or more pistons operatively coupled to the linear alternator, said pistons actuated by acoustic energy in a traveling wave of the flow of gas through the linear alternator; and a motor operatively coupled to each piston for generating an electric current.

In an embodiment, the multi-stage traveling wave thermoacoustic engine includes four thermal buffer tube stages and four regenerator stages.

In an embodiment, the multi-stage traveling wave thermoacoustic engine includes three thermal buffer tube stages and three regenerator stages.

In an embodiment, the multi-stage traveling wave thermoacoustic engine includes five thermal buffer tube stages and five regenerator stages.

In another embodiment the invention encompasses a satellite including any of the above multi-stage traveling wave thermoacoustic engines.

In another embodiment, the invention encompasses a torus for a multi-stage traveling wave thermoacoustic heat engine including a domed cylindrical shell; a slotted heat exchanger and flow turner in the domed end of the shell; a thermal buffer tube inside and coaxial to said shell below the slotted heat exchanger and flow turner; an annular regenerator between said shell and said thermal buffer tube; a first plurality of partitions inside said thermal buffer tube, said plurality of partitions dividing said thermal buffer tube into a plurality of thermal buffer tube stages; and a second plurality of partitions equal to the first plurality of partitions dividing said annular regenerator into a plurality of regenerator stages corresponding to the thermal buffer tube stages.

In a further embodiment, the torus has four thermal buffer tube stages and four regenerator stages.

In a further embodiment, the torus has three thermal buffer tube stages and three regenerator stages.

In a further embodiment, the torus has five thermal buffer tube stages and five regenerator stages.

DESCRIPTION OF THE DRAWINGS

Features of example implementations of the invention will become apparent from the description, the claims, and the accompanying drawings in which:

FIG. 5 depicts the principles of a multi-stage thermoacoustic engine with physically separated stages.

FIG. 6A depicts a side view of a multi-stage thermoacoustic engine according to the present invention.

FIG. 6B depicts a top view of a multi-stage thermoacoustic engine according to the present invention.

FIGS. 7A and 7B depict a perspective view of a multi-stage thermoacoustic engine according to the present invention.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 1:
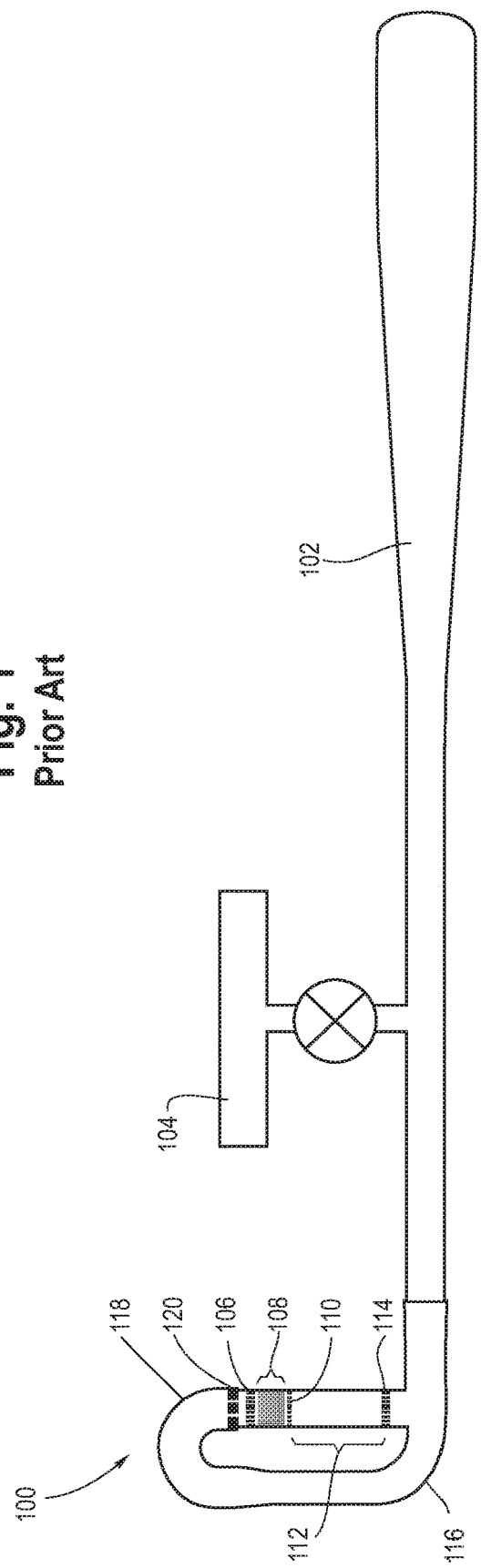
FIG. 1 depicts a schematic diagram of a prior art thermoacoustic engine.
Figure 2:
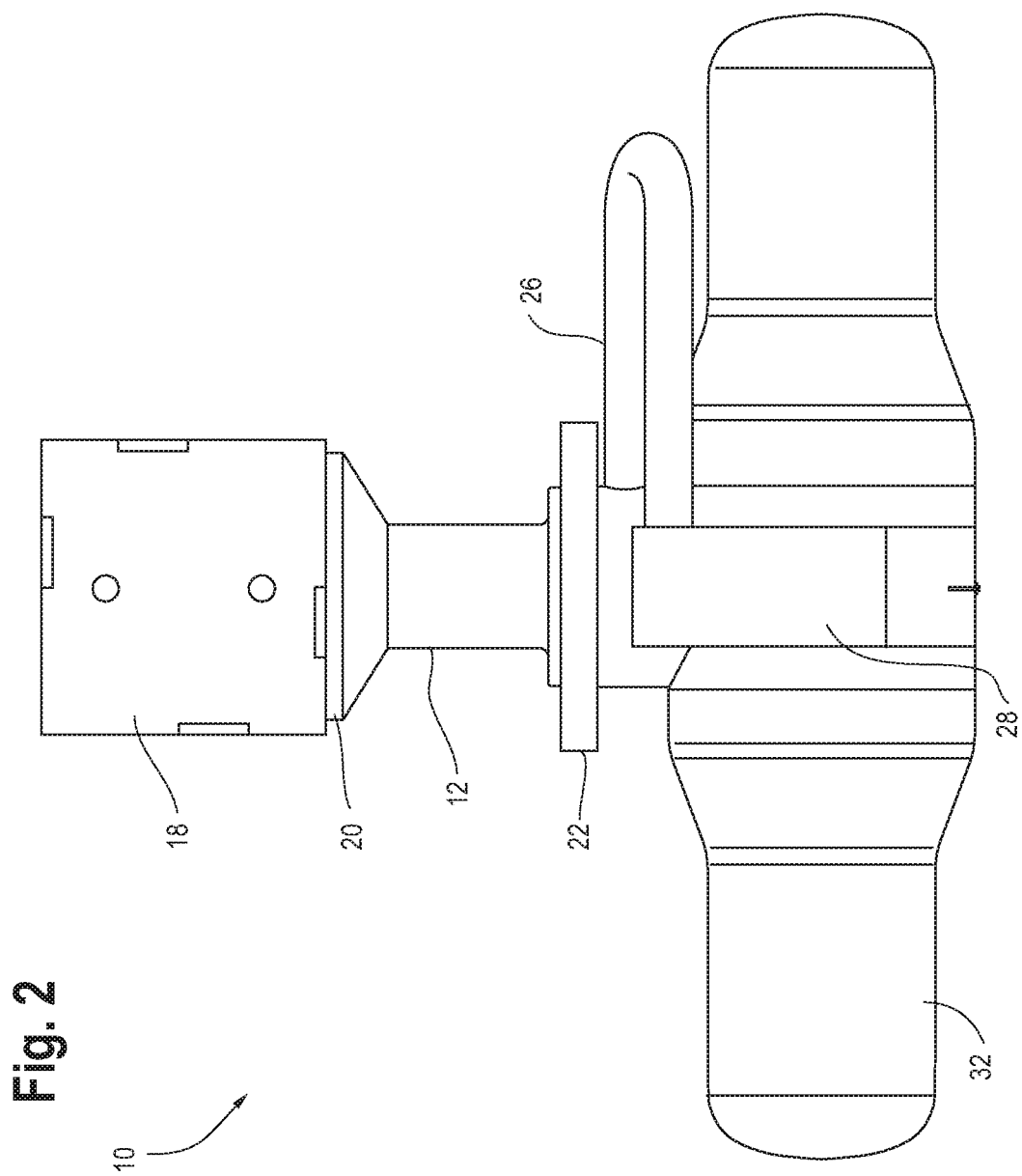
FIG. 2 depicts a thermoacoustic engine according to the present invention.

FIG. 2 depicts an overview of a multi-stage traveling wave thermoacoustic engine 10 according to the present invention. In an embodiment, thermoacoustic engine 10 is a sealed system filled with high pressure helium gas, although any suitable gas could be used. A heat source 18 is attached to one end of shell 12 by a heat spreader 20. In an embodiment, heat source 18 is a general purpose heat source, for example, a radio-isotope substance such as plutonium. Heat spreader 20 couples energy from heat source 18 to a heat exchanger inside shell 12 which functions similarly to hot heat exchanger 110 of FIG. 1. Further details of the structures inside shell 12 will be discussed in connection with subsequent Figures. Thermal mechanical interface (TMI) 22 is located at the opposite end of shell 12. TMI 22 coordinates with another heat exchanger inside shell 12 which functions similarly to cold heat exchanger 106 of FIG. 1. Heat source 18 and TMI 22 create a temperature difference between the ends of shell 12 which causes sufficient acoustic gain to sustain an oscillation in the helium gas inside shell 12.

The oscillating gas forms a traveling wave in shell 12, enters a compliance (shown in FIG. 3), then passes through inertance 26 to linear alternator 28, where it is fed back to shell 12. Cylinder body 32 encloses a piston and motor assembly that is used to convert the acoustic power in the traveling wave of oscillating helium gas into electrical energy as explained further below.

Figure 3:
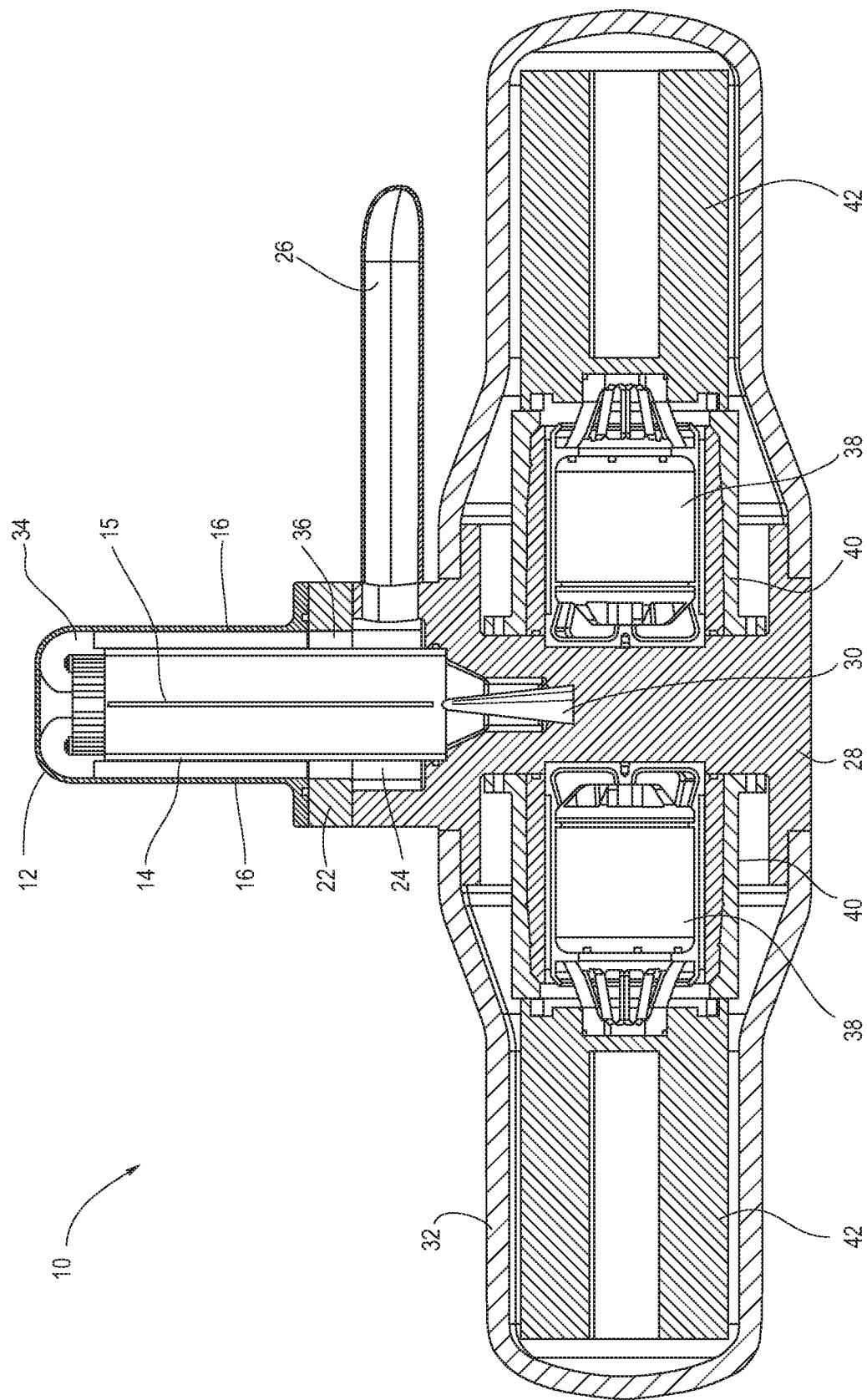
FIG. 3 depicts a section view of the thermoacoustic engine of FIG. 2.

FIG. 3 is a section view of the thermoacoustic engine of FIG. 2. Common elements are denoted with common reference numbers. Regenerator shell 12 encloses thermal buffer tube 14. A set of partitions as represented by partition 15 divides thermal buffer tube into stages as will be discussed in more detail in connection with FIGS. 6A and 6B. Regenerator 16 is a cylinder located in the space between shell 12 and tube 14. Regenerator 16 is also divided into stages by partitions that are not shown so that other features of the thermoacoustic engine can be depicted clearly. In general, a slotted heat exchanger/flow turner 34 supports the transfer of heat from heat source 18 (FIG. 2) to the traveling wave of gas, and helps direct the wave from thermal buffer tube 14 into regenerator 16. From regenerator 16 the gas passes through slotted heat exchanger 36 which facilitates heat transfer between the gas and TMI 22. The cooled gas enters annular compliance 24 and is fed back to linear alternator 28 through inertance 26. Jet pump 30 assists in maintaining an even flow of gas through the system.

The acoustic energy of the traveling wave of gas is translated into mechanical and then electrical energy through linear alternator 28, which is coupled to piston 38 oscillating inside cylinder 40 and coupled to motor 42.

Figure 4:
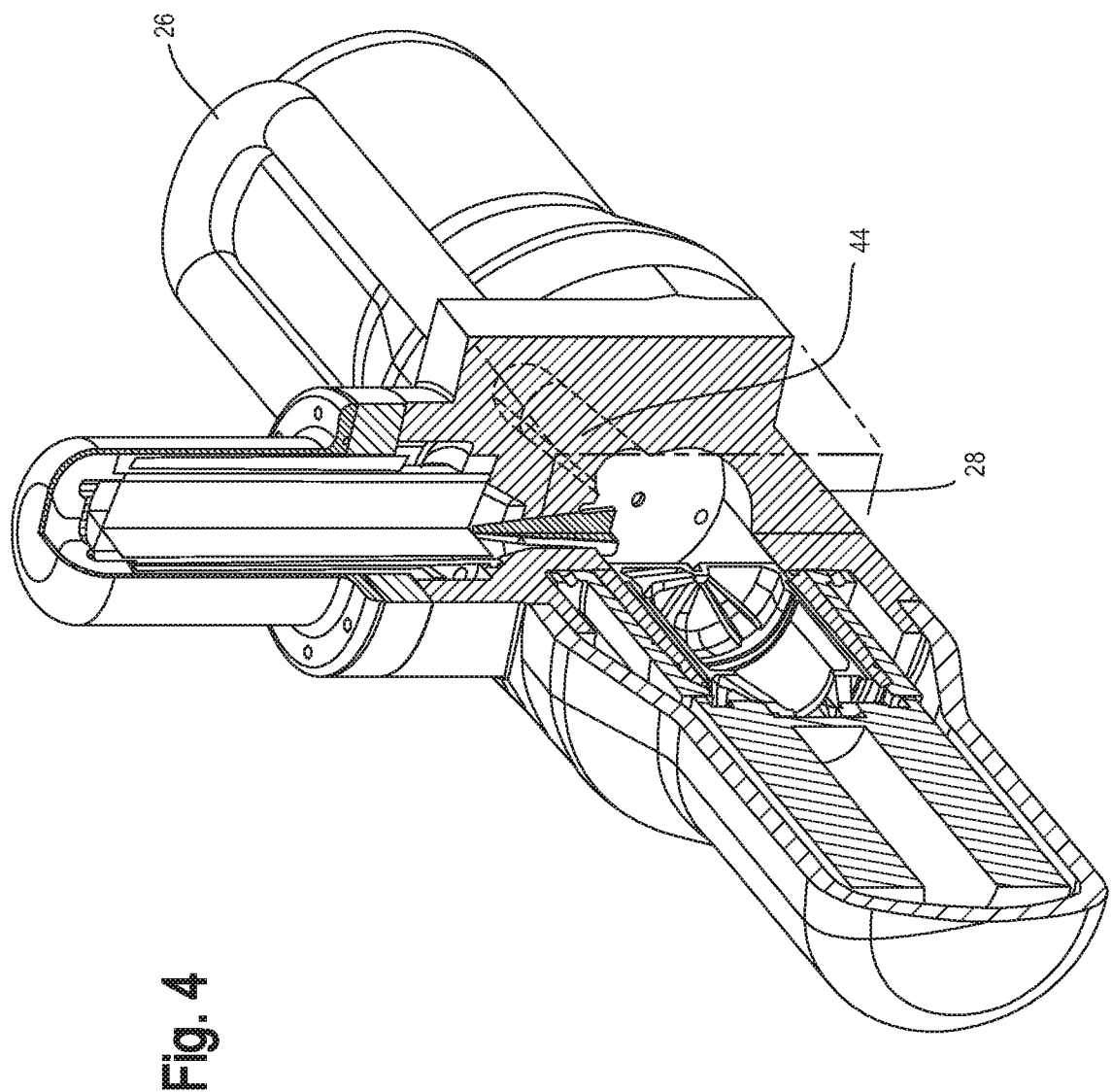
FIG. 4 is a perspective, partial cutaway view of the thermoacoustic engine of FIGS. 2 and 3.

FIG. 4 is a perspective, partial cutaway view of the thermoacoustic engine of FIG. 3. In particular, FIG. 4 depicts the feedback path from inertance 26 to linear alternator 28 through passage 44. Inertance 26 is used to control the phase of gas oscillations through the thermoacoustic engine.

As explained above, the power gain provided by a single stage engine is limited by the ratio between the temperatures at either end of regenerator. Typically, a temperature ratio of 3 is the maximum difference allowed by conventional material between the hot end and a cold end near ambient temperature. Many potential applications are enabled by temperature ratio of 2 and below. Therefore, gain is increased by cascading several single stage engines in series, as depicted conceptually in FIG. 5. In particular, FIG. 5 illustrates the flow of acoustic power 50 through the cascaded stages 46 and 48. As a practical matter, the stages could be interconnected in a variety of orientations. The hot end of stage 46 is connected to the cold end of the stage 48 by a thermal buffer tube 52. Although two stages are shown in FIG. 5, a multi-stage thermoacoustic engine may include any number of stages, depending on performance criteria.

Physically separating thermoacoustic engine stages has several disadvantages. Each stage experiences more heat loss, is less efficient and the ratio of surface area to volume is poor. In addition, constraints on physical orientation of several stages require tradeoffs in the location of the heat source as well as internal losses associated with moving acoustic power from one stage to another. The present invention encompasses a multi-stage thermoacoustic heat engine that minimizes these disadvantages.

FIGS. 6A and 6B depict a coaxial toroidal spiral cascaded multi-stage traveling wave thermoacoustic engine according to the present invention. FIG. 6A depicts a side view of the thermoacoustic engine. Thermal buffer tube 60 and heat exchanger 70 are enclosed by regenerator shell 80, similarly to FIGS. 2-4. An annular regenerator is also included but not shown in this view. The space inside shell 80 is divided into stages. Thermal buffer tube 60 is divided into stages 62, 64, 66 and 68 by partitions 61, 63, 65 and 67 as shown in a top view in FIG. 6B. Although partitions 61, 63, 65 and 67 are shown as individual elements, they may also be formed as a single piece.

Similarly, regenerator 70 is also divided into four stages 72, 74, 76 and 78 by partitions 82, 84, 86 and 88 as shown in FIG. 6B. This configuration creates a four stage thermoacoustic engine within regenerator shell 80. Three stages, 64, 66 and 68, of thermal buffer tube 60 are blocked by a lower plate 90 located between thermal buffer tube 60 and linear alternator 94. Although four stages are depicted in FIGS. 6A and 6B, the invention is not limited to a particular number of stages. In an alternative, the embodiment of FIGS. 6A and 6B could also be configured with, for example, two, three, five or other numbers of stages, depending on desired performance characteristics. In addition, stages or other fractional components may not be of uniform size, in order to further fine tune performance characteristics.

The flow of acoustic power through the gas in the multistage thermoacoustic engine will now be described as depicted by line 92 as depicted in both FIGS. 6A and 6B. Acoustic power (oscillating pressure in the gas) enters stage 62 of thermal buffer tube 60 from linear alternator 94. It travels up stage 62 between partitions 61 and 67, over the top of thermal buffer tube 60 through heat exchanger 70 and back down regenerator stage 72. Curved portions 83 and 85 of partitions 82 and 84, respectively (shown in more detail in FIG. 7) direct the flow of the oscillating gas into slot 96 at a lower end of adjacent stage 64 in thermal buffer tube 60. Similarly, the acoustic power in the gas travels up stage 64, over the top through heat exchanger 70, back down regenerator stage 74, around and into a slot (not shown) in the lower end of adjacent stage 66 of thermal buffer tube 60. From there acoustic power travels up stage 66, over the top through heat exchanger 70, back down regenerator stage 76, around and into a slot (not shown) in the lower end of adjacent stage 68 of thermal buffer tube 60. Finally, the acoustic power in the gas travels up stage 68 of thermal buffer tube 60 and down regenerator stage 78 to compliance 97 and then to inertance 98 for the feedback path to linear alternator 94 as described above.

The above described acoustic power flow path is similar the path of electrical current in a toroidal inductor. The toroidal multi-stage thermoacoustic heat engine combines a series of traveling wave thermoacoustic heat engine stages into a toroidal spiral inside a single domed pressure vessel such that all of the thermoacoustic power cycles past a common set of thermal interfaces multiple times within the common pressure vessel and common coaxial buffer tube space. This enables an N-stage engine (where N can be 2, 3, 4, etc) within the compact and low stress geometry of a single domed pressure vessel.

FIGS. 7A and 7B depict perspective views of a portion of the interior of the multi-stage thermoacoustic engine of FIGS. 6A and 6B. Common elements are denoted with common reference numbers. Thermal buffer tube 60 includes partitions 61, 63, 65 and 67. Regenerator partitions 82, 84, 86 and 88 are also shown. Line 92 in FIG. 7B shows a portion of the flow of acoustic power through the thermal buffer tube and regenerator stages as explained above.

Figure 8:
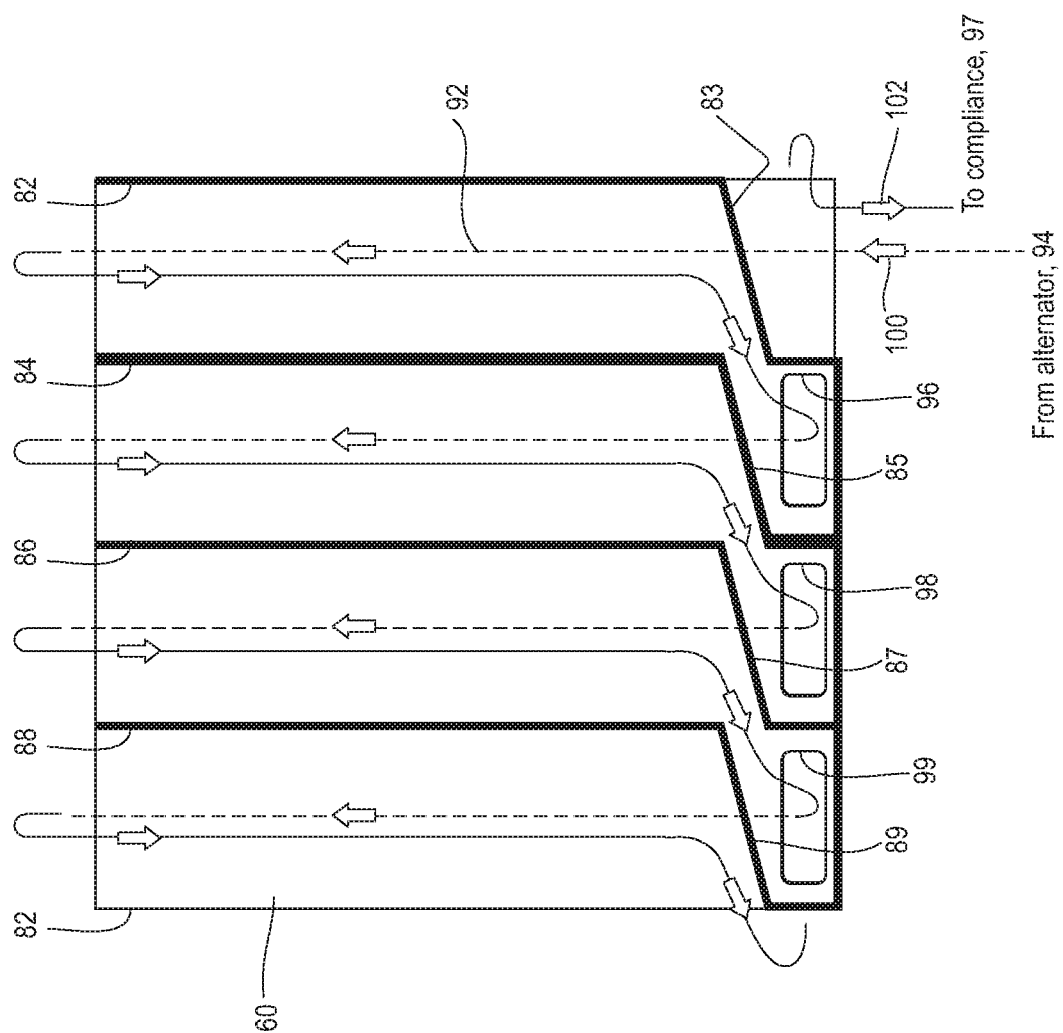
FIG. 8 depicts a schematic diagram illustrating the flow of acoustic power in the multi-stage thermoacoustic engine of FIG. 7.

FIG. 8 is a schematic diagram illustrating another view of the flow of acoustic power in the multi-stage thermoacoustic engine of FIGS. 7A and 7B. In effect, FIG. 8 shows the regenerator stages of FIGS. 7A and 7B in an unrolled view so as to clarify the flow of acoustic power through the stages. Thermal buffer tube 60 is unrolled and effectively lying flat against the page. Stages in the regenerator are shown by partitions 82, 84, 86 and 88. The acoustic power flow 92 enters a first stage of thermal buffer tube 60 from linear alternator 94 (FIG. 6A) at 100. It exits the top of thermal buffer tube 60 into the regenerator stage between partitions 82 and 84, past curved portions 83 and 85 into slot 96 of the adjacent thermal buffer tube stage. Similarly the flow of acoustic power 92 moves through the next regenerator stage between partitions 84 and 86 into slot 98, through thermal buffer tube 60 again, then down through the regenerator stage between partitions 86 and 88. After traveling through the last thermal buffer tube and regenerator stage, acoustic power flow 92 wraps around to the right end of thermal buffer tube 60 and exits to compliance 97 at 102.

There are several viable construction approaches to achieving the requisite pressure seal between segments; a) brazing or diffusion bonding partitions between coaxial cylindrical elements b) inserting formed segments into the coaxial cylindrical elements, c) tight fit interference seals or c) 3-D printing. This is not an exhaustive list of construction methods, nor does any particular method need to be used throughout the engine (e.g. the segmenting of the annular regenerator could utilize one technique, while the segmenting of the thermal buffer tube could use another technique). The segments in the thermal buffer tube should be straight in order to preserve the planar traveling wavefront needed to prevent thermal mixing. Any of the other components (regenerator, hot heat exchanger, cold heat exchanger, or plenums) can be used to transition. The optimum transition between segments is plenum following each cold heat exchanger.

In an embodiment, a thermoacoustic engine according to the present invention has overall dimensions of approximately 21 cm by approximately 38 cm by approximately 10 cm. However, these dimensions are not limiting and principles of the invention may be applied to a thermoacoustic engine of any size. A variety of materials may be used to construct the inventive thermoacoustic engine, including metals and ceramics.

If used and unless otherwise stated, the terms "upper," "lower," "front," "back," "over," "under," and similar such terms are not to be construed as limiting the invention to a particular orientation. Instead, these terms are used only on a relative basis.

An illustrative description of operation of the apparatus 100 is presented, for explanatory purposes.

The apparatus 10 in one example comprises a plurality of components such as one or more of electronic components and hardware components. A number of such components can be combined or divided in the apparatus 10. The apparatus 10 in one example comprises any (e.g., horizontal, oblique, or vertical) orientation, with the description and figures herein illustrating one example orientation of the apparatus 10, for explanatory purposes.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A multi-stage traveling wave thermoacoustic engine, comprising:
   a domed cylindrical shell;
   a thermal buffer tube coaxially located inside said shell, said thermal buffer tube further comprising one or more circumferentially adjacent tube partitions dividing the thermal buffer tube into a plurality of sealed tube stages;
   an annular regenerator located between the shell and the thermal buffer tube, said regenerator further comprising one or more circumferentially adjacent regenerator partitions dividing the regenerator into a plurality of sealed regenerator stages corresponding to the stages in the thermal buffer tube;
   a hot heat exchanger at a first end of said shell; and
   a cold heat exchanger at a second end of said shell opposite the first end;
   wherein said thermal buffer tube stages and said regenerator stages are operatively coupled such that a gas flow enters a lower end of a first thermal buffer tube stage, flows past the hot heat exchanger into a first regenerator stage and is directed by the one or more regenerator partitions into a second thermal buffer tube stage adjacent to the first thermal buffer tube stage.

2. The multi-stage traveling wave thermoacoustic engine of claim 1, wherein the second thermal buffer tube stage further comprises an opening for receiving the gas flow from the first regenerator stage.

3. The multi-stage traveling wave thermoacoustic engine of claim 1, wherein the thermal buffer tube stages and the regenerator stages are operatively coupled such that the gas flows past the hot heat exchanger into a second regenerator stage and is directed by the one or more regenerator partitions into a third thermal buffer tube stage adjacent to the second thermal buffer tube stage.

4. The multi-stage traveling wave thermoacoustic engine of claim 3, wherein the third thermal buffer tube stage further comprises an opening for receiving the gas flow from the second regenerator stage.

5. The multi-stage traveling wave thermoacoustic engine of claim 1, further comprising:
   a compliance;
   an inertance coupled to said compliance; and
   a linear alternator operatively coupled to the first thermal buffer tube stage;
   wherein the gas flow exits a regenerator stage and enters the compliance.

6. The multi-stage traveling wave thermoacoustic engine of claim 5, wherein the linear alternator further comprises a jet pump.

7. The multi-stage traveling wave thermoacoustic engine of claim 5, further comprising:
   two or more pistons operatively coupled to the linear alternator, said pistons actuated by acoustic energy in a traveling wave of the flow of gas through the linear alternator; and
   a motor operatively coupled to each piston for generating an electric current.

8. The multi-stage traveling wave thermoacoustic engine of claim 1, further comprising four thermal buffer tube stages and four regenerator stages.

9. The multi-stage traveling wave thermoacoustic engine of claim 1, further comprising three thermal buffer tube stages and three regenerator stages.

10. The multi-stage traveling wave thermoacoustic engine of claim 1, further comprising five thermal buffer tube stages and five regenerator stages.

11. A satellite comprising the thermoacoustic engine of claim 1.

12. A torus for a multi-stage traveling wave thermoacoustic heat engine comprising:
   a domed cylindrical shell;
   a slotted flow turner heat exchanger in a domed end of the shell;
   a thermal buffer tube inside and coaxial to said shell below the slotted flow turner heat exchanger;
   an annular regenerator between said shell and said thermal buffer tube;
   a first plurality of circumferentially adjacent partitions inside said thermal buffer tube, said first plurality of partitions dividing said thermal buffer tube into a plurality of thermal buffer tube stages; and
   a second plurality of circumferentially adjacent partitions equal to the first plurality of partitions dividing said annular regenerator into a plurality of regenerator stages corresponding to the thermal buffer tube stages.

13. The torus of claim 12, further comprising four thermal buffer tube stages and four regenerator stages.

14. The torus of claim 12, further comprising three thermal buffer tube stages and three regenerator stages.

15. The torus of claim 12, further comprising five thermal buffer tube stages and five regenerator stages.

* * * * *